UNITED STATES PATENT OFFICE.

HARRY G. WILDMAN, OF MONTREAL, QUEBEC, CANADA.

PROCESS FOR THE EXTRACTION OF ALUMINA FROM CLAY.

1,326,384.   Specification of Letters Patent.   Patented Dec. 30, 1919.

No Drawing.   Application filed February 6, 1918. Serial No. 215,652.

*To all whom it may concern:*

Be it known that I, HARRY G. WILDMAN, a subject of the King of Great Britain, and a resident of the city of Montreal, in the Province of Quebec and Dominion of Canada, have invented new and useful Improvements in Processes for the Extraction of Alumina from Clay, of which the following is a full, clear, and exact description.

This invention relates to a process for the separation of alumina from clay, the main object being to provide a simple, inexpensive and efficient method of obtaining aluminum and its salts from materials other than bauxite.

A further object is to provide a process whereby valuable by-products may be produced without additional cost.

Alumina, the oxid from which the metal is made, is at present obtained from bauxite, which carries from 50% to 60% of the oxid, by a process of fusion with soda and precipitation with carbon dioxid gas. The supply of bauxite is at present limited and in the recovery of aluminum by the present process there are no by-products obtained. Clay on the other hand is abundant, carrying from 20% in common blue clay to 40% in white china clay of oxid of aluminum.

According to my process, clay, preferably china clay, is boiled with a solution prepared from soda ash, or other alkali. This solution is made by boiling the soda ash with an insufficient quantity of lime to convert all the carbonate to hydrate. If more lime is used, sodium carbonate may be added to the clear solution of hydrate so obtained. During the boiling of the clay with this alkaline solution, the clay combines with a portion of the alkali and is converted into a state in which it can be readily decomposed by the addition of a weak acid. If the acid forms soluble salts of aluminum, then the liquid will contain the salt of aluminum and the corresponding salt of sodium. The residue will be the silica that was combined with the alumina, together with the impurities that were contained in the clay. If the clay contains iron, then a gentle ignition previous to the boiling with an alkaline solution is required to oxidize the iron into a state in which it is insoluble in the acid employed.

The liquid in which the clay was boiled is drawn off and an additional amount of the alkalis, namely, sodium carbonate and sodium hydrate, is added equivalent to the amount taken up by the clay, after which the solution is again ready for use.

According to my process, advantage is taken of the fact that aluminum sulfite, when freshly prepared, is soluble in cold water containing sulfur dioxid gas. Aluminum sulfite forms with sulfur dioxid gas, a compound soluble in cold water, but which compound is decomposed by heat, releasing the sulfur dioxid gas with which it had combined in the cold water. The gas from burning pyrites or sulfur is led into a storage vessel and then stored under pressure, so that when required the gas can be forced into a digester lined with enamel or any substance unaffected by the gas containing the prepared clay and water, the gas being thoroughly agitated with the cold mixture until all absorption ceases. After this, the mixture is blown thrown a filter press or other strainer, capable of holding back precipitated silica, into a second digester, which must be fitted with closed steam coils and a vacuum pump. On heating the liquid, the higher sulfites of aluminum are decomposed, giving up the sulfur dioxid gas which kept the sulfite in solution, and this gas is removed by the pump to the storage tank for use with the next batch. At the same time, the aluminum sulfite being insoluble in liquid in the absence of sulfur dioxid gas is precipitated and recovered as filter cake, after a slight washing in the filter press, or as a sludge if the mixture of sulfite and liquid be run into tanks to settle. The precipitate is ignited to recover the sulfur dioxid gas which is led back to the storage tank after leaving aluminum oxid ready for the electric reduction to metal. Should a trace of sulfur remain in the alumina, this can be removed by washing with a weak solution of caustic soda. The water from which the sulfite of aluminum was recovered contains the balance of the sodium as sulfite. This sodium sulfite can be recovered as such; or it can be converted into hyposulfite of sodium; or it can be boiled with milk of lime, precipitating sulfite of calcium, which on ignition gives up the sulfur dioxid gas to be returned to the storage tank, and caustic soda to go back for use in another batch of the materials.

Besides extracting aluminum oxid by my process, I also recover a by-product of silica in an extremely fine state of division and, when white clays free or almost free from iron are used, the precipitated silica is white in color and its sale will very considerably reduce the cost of the separation process. Furthermore, the chemicals used in this process are all cheaply recoverable.

Having thus described my invention, what I claim is:—

1. A process for separating alumina from clay, which consists in first rendering the alumina of clay soluble, and then dissolving the alumina in the presence of sulfurous anhydrid.

2. A process for separating alumina from clay, which consists in first rendering the alumina of clay soluble, and then dissolving the alumina by treating the mixture with water and sulfur dioxid gas.

3. A process for separating alumina from clay, which consists in first rendering the alumina of clay soluble, and then dissolving the alumina by treating the mixture with cold water and sulfur dioxid gas.

4. A process for separating alumina from clay, which consists in first boiling the clay with an alkaline solution, then dissolving the alumina in the presence of sulfurous anhydrid, and then precipitating the aluminum sulfite.

5. A proces for separating alumina from clay, which consists in first rendering the alumina of clay soluble, then dissolving the alumina by treating the mixture with cold water and sulfur dioxid gas under pressure, and then precipitating the aluminum sulfite by raising the temperature of the mixture.

In witness whereof, I have hereunto set my hand.

HARRY G. WILDMAN.